(12) United States Patent
Janssen et al.

(10) Patent No.: US 9,399,903 B2
(45) Date of Patent: *Jul. 26, 2016

(54) METHOD AND SYSTEM FOR ENHANCING OIL RECOVERY (EOR) BY INJECTING TREATED WATER INTO AN OIL BEARING FORMATION

(71) Applicant: SHELL OIL COMPANY, Houston, TX (US)

(72) Inventors: Albert Joseph Hendrik Janssen, Rijswijk (NL); Guillo Alexander Schrader, Amsterdam (NL); Paulus Henricus Joannes Verbeek, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,088

(22) Filed: Jun. 15, 2015

(65) Prior Publication Data
US 2015/0275635 A1 Oct. 1, 2015

Related U.S. Application Data

(63) Continuation of application No. 13/728,646, filed on Dec. 27, 2012, now Pat. No. 9,085,971.

(30) Foreign Application Priority Data

Dec. 29, 2011 (EP) .................................. 11196116

(51) Int. Cl.
| | |
|---|---|
| *E21B 43/16* | (2006.01) |
| *E21B 43/20* | (2006.01) |
| *C02F 1/469* | (2006.01) |
| *B01D 61/04* | (2006.01) |
| *B01D 61/02* | (2006.01) |
| *B01D 61/14* | (2006.01) |

(Continued)

(52) U.S. Cl.
CPC .............. *E21B 43/20* (2013.01); *B01D 61/027* (2013.01); *B01D 61/04* (2013.01); *B01D 61/147* (2013.01);

(Continued)

(58) Field of Classification Search
CPC ................ E21B 43/16; B01D 2311/04; B01D 2311/2633; B01D 61/027
USPC ....................................... 166/305.1, 371, 275
See application file for complete search history.

(56) References Cited

U.S. PATENT DOCUMENTS 3,354,068 A * 11/1967 Rowland et al. .............. 204/550
7,144,511 B2 12/2006 Vuong (Continued)

FOREIGN PATENT DOCUMENTS

| GB | 1520877 A | 8/1978 |
|---|---|---|
| GB | 2450269 A | 10/2007 |

(Continued)

OTHER PUBLICATIONS

PCT International Search Report, Application No. PCT/EP2012/076415 dated Feb. 22, 2013.

(Continued)

*Primary Examiner* — Doug Hutton, Jr.
*Assistant Examiner* — Silvana Runyan
(74) *Attorney, Agent, or Firm* — Richard B. Taylor

(57) ABSTRACT

A process and a system for enhancing recovery of oil from an oil-bearing formation are provided in which water having a total dissolved solids content is filtered to remove some solids in a filter assembly, the filtered water is treated to remove some ions in a capacitive deionization assembly, and the filtered deionized water is injected into the oil-bearing formation to mobilize crude oil and enhance oil recovery from the formation.

10 Claims, 1 Drawing Sheet

(51) Int. Cl.
 *C09K 8/58* (2006.01)
 *C02F 1/44* (2006.01)
 *C02F 103/08* (2006.01)

(52) U.S. Cl.
 CPC .............. *C02F 1/4691* (2013.01); *C09K 8/58* (2013.01); *E21B 43/16* (2013.01); *B01D 2311/04* (2013.01); *B01D 2311/2603* (2013.01); *C02F 1/442* (2013.01); *C02F 1/444* (2013.01); *C02F 2103/08* (2013.01); *C02F 2201/4617* (2013.01)

(56) References Cited

U.S. PATENT DOCUMENTS

| | | | | |
|---|---|---|---|---|
| 7,789,159 | B1* | 9/2010 | Bader | 166/371 |
| 2008/0185346 | A1* | 8/2008 | Xiong et al. | 210/748 |
| 2009/0308609 | A1* | 12/2009 | Curole et al. | 166/275 |

FOREIGN PATENT DOCUMENTS

| | | |
|---|---|---|
| WO | 2007138327 A1 | 12/2007 |
| WO | 2011135048 A1 | 11/2011 |

OTHER PUBLICATIONS

Gabelich et al., Environmental Science and Technology, vol. 36/13, p. 3017, 2002.

M.A. Anderson et al. "Capacitive deionization as an electrochemical means of saving energy and delivering clean water. Comparison to present desalination practices: Will it compete?" Journal Electrochimica Acta 55(2010) 3845-3856.

Muraleedaaran et al., Is Reverse Osmosis Effective for Produced Water Purification? Viability and Economic Analysis, Proceedings of SPE Western Regional Meeting, Mar. 1, 2009.

* cited by examiner

CDI Assembly

METHOD AND SYSTEM FOR ENHANCING OIL RECOVERY (EOR) BY INJECTING TREATED WATER INTO AN OIL BEARING FORMATION

CROSS REFERENCE TO EARLIER APPLICATIONS

The present application is a Continuation of application Ser. No. 13/728,646, filed Dec. 27, 2012, which claims the benefit of European Patent Application No. 11196116.5, filed Dec. 29, 2011, the entire disclosure of which is hereby incorporated by reference.

BACKGROUND OF THE INVENTION

The invention relates to a method and system for Enhancing Oil Recovery (EOR) by injecting treated water into an oil bearing formation.

Only a portion of oil present in an oil-bearing formation is recoverable as a result of the natural pressure of the formation. The oil recovered from this "primary" recovery typically ranges from 5% to 35% of the oil in the formation. Enhanced oil recovery methods have been developed to increase the amount of oil that may be recovered from an oil-bearing formation above and beyond that recovered in primary recovery.

Water-flooding, in which water is injected through an injection well into an oil-bearing formation to mobilize and drive oil through the formation for production from a production well, is a widely used method of secondary recovery used to increase the amount of oil recovered from a formation beyond primary recovery. Recently, water-flooding utilizing water having low salinity has been utilized to increase the amount of oil recovered from a formation relative to the amount of oil recovered in a conventional higher salinity water-flood. Low salinity water may be used in place of higher salinity water conventionally used in a water-flood in a secondary recovery, or low salinity water may be used after a conventional higher salinity water-flood to incrementally increase oil recovery over that of the initial water-flood in a tertiary recovery process.

Injection of low salinity water into a formation may reduce the ionic bonding of oil to the formation within pores in the formation by double layer expansion, leading to a reduction in the rock's adsorption capacity for hydrocarbons. This increases the mobility of the oil in the formation by making the surface of the pores of the formation more water-wet and less oil-wet, permitting the mobile oil to be removed from the pores in which it resides and to be driven to a production well for production from the formation.

Low salinity water utilized in low salinity water-flooding typically has a total dissolved solids ("TDS") content ranging from 200 parts per million ("ppm") to 5000 ppm, and preferably has a TDS content ranging from 1000 ppm to 5000 ppm to provide adequate salinity in the water to prevent formation damage.

Frequently, the low salinity water provided for enhanced oil recovery is produced by desalinating a source water having significantly higher salinity. Seawater is a common source water treated to provide the low salinity water, particularly for offshore oil recovery. Seawater typically has a TDS content between 30000 ppm and 50000 ppm. Brackish water, high salinity formation water produced from a formation, and high salinity aquifer water may also be utilized as source water that may be desalinated to provide the low salinity source water. Such water sources may have a TDS content ranging from 10000 ppm to 250000 ppm.

Commonly applied technologies for desalination of water include distillation processes, such as Multi Stage Flash, Multi Effect Distillation, Mechanical Vapour Compression and/or Thermal Vapour Compression, and membrane processes, such as Reverse Osmosis (RO), Nano Filtration (NF) and/or Electrodialyses. International patent application WO2011/135048 of Voltea B.V. and the website www.voltea.com disclose a method and apparatus for removal of ions from, for example, wastewater by Capacitive De-Ionisation (CDI). More information on CDI can be found in the scientific paper Environmental Science and Technology, vol. 36/13, page 3017, 2002 and in the article "Capacitive deionization as an electrochemical means of saving energy and delivering clean water. Comparison to present desalination practices: Will it compete?" by M. A. Anderson et al. published the Journal Electrochimica Acta 55(2010)3845-3856 and at website www.elsevier.com/locate/electacta.

The latter article by M. A. Anderson et al. shows in FIG. 8 the amount of electrical work required to desalinate water with different salinities and concludes that under the selected conditions and at concentrations below 5000 mg/L, CDI could be a competitive technology even if moderate efficiencies, from 60-70%, are attained.

The most commonly used method for desalination of water used for EOR generally comprises a Micro Filter (MF) or Ultra Filter (UF) assembly for filtering solids from the water and a Reverse Osmosis (RO) assembly or a combination of a nanofiltration assembly and a RO assembly for subsequent water desalination. Several studies on offshore desalination of seawater have concluded that Seawater Reverse Osmosis (SWRO) with either conventional or membrane pre-treatment is by far the most viable desalination method available for offshore application due to suitable weight, cost, footprint, and designed output capacities.

A proper treatment of EOR low salinity injection water is critical to prevent salinity related formation damage. If the clays that are present in the formation are incompatible with the injection water, de-flocculation of the clays could occur. When the clays de-flocculate in the formation, the clay particles may disperse and migrate into the pore throats, resulting in formation damage. In general the injection water/completion fluid must have an adequate salinity (measured in total and/or divalent cation concentration) to prevent de-flocculation of formation clays when the system is in equilibrium. Additionally there must be enough divalent cations (i.e. $Ca^{++}$, $Mg^{++}$) present in the displacing fluid (e.g. injected seawater) to prevent de-flocculation of the formation clay during the transition from one water composition to another.

A drawback of both distillation technologies and SWRO's, is that the treated source water has a too high purity requiring blending with seawater or a high salinity membrane retentate stream to adjust the TDS level to the desired levels. Distillation and RO membrane desalination technologies typically reduce the TDS content of the treated source water to less than 500 ppm, often less than 200 ppm. To avoid formation damage, a low salinity water having a TDS of from 1000 ppm to 5000 ppm is desirable, therefore, ions are typically added back to water produced by distillation or RO membrane desalination technologies for use in an EOR application, for example by blending with seawater or with a high salinity membrane retentate stream. Further drawbacks of RO are that RO membranes are sensitive to fouling and RO is energy-intensive.

There is a need to provide an improved and efficient seawater treatment method and system for EOR, which provide treated water with purity, salinity and TDS level suitable for EOR and which therefore do not require subsequent re-blending with raw seawater to re-adjust the TDS level to a desired level, and which is less sensitive to fouling and less energy-intensive than RO.

SUMMARY OF THE INVENTION

In accordance with the invention there is provided a method for Enhancing Oil Recovery (EOR) from an oil bearing formation, the method comprising: filtering at least some solids from a source water having a total dissolved solids content of from 10000 ppm to 50000 ppm in a filtration assembly to produce pre-treated water; further treating the pre-treated water in a Capacitive De-Ionisation (CDI) assembly comprising at least one flowpath for pre-treated seawater arranged between a pair of oppositely charged electrodes which adsorb and thereby remove at least some ions from the pre-treated water flowing through the flowpath, thereby producing treated water with a reduced salinity and solids content relative to the source water; and injecting the treated water with reduced salinity and solids content into the formation to mobilize crude oil and enhance oil recovery.

The electrodes may comprise substantially parallel porous plates comprising carbon aerogel and/or activated carbons that are electrically charged by a Direct Current (DC) electrical power source connected to the plates.

The filtration assembly may comprise a microfilter assembly. The microfilter assembly may generate pre-treated seawater with a reduced hardness and sulphate concentration and with less than 1 parts per million (ppm) oil and less than 1 parts per million (ppm) of Total Suspended Solids (TSS).

The source water may had a total dissolved solids (TDS) content of from 10000 ppm to 50000 ppm. The source water may be selected from the group consisting of seawater, brackish water, water produced from the formation, saline aquifer water, and mixtures thereof. The treated water has reduced salinity and reduced solids content relative to the source water. The treated water may have a TDS between 1,000 and 5,000 parts per million (ppm), or from 2000 ppm to 5000 ppm.

It is believed that the above operating envelope of an NF and CDI assembly has a synergetic effect that optimizes the efficiency and performance of the NF and CDI assembly in an unexpected manner, which overcomes the prejudice stemming from the article by M. A. Anderson et al. that CDI would only be efficient for desalination of brackish water with a TDS of less than 5000 mg/Liter.

In accordance with the invention there is furthermore provided a system for Enhancing Oil Recovery (EOR) from an oil bearing formation, the system comprising:
a filtration assembly for filtering at least some solids from a source water having a TDS content of from 10000 ppm to 50000 ppm to produce pre-treated water;
a Capacitive De-Ionisation (CDI) assembly comprising at least one flowpath for pre-treated water arranged between a pair of substantially parallel oppositely charged electrodes which adsorb and thereby remove at least some ions from the pre-treated water flowing through the flowpath, for producing treated water with a reduced salinity and solids content; and means for injecting the treated water with reduced salinity and solids content into the subsurface formation to mobilize crude oil and thereby enhance crude oil recovery from the formation.

The filtration assembly may comprise a capillary Nano Filtration (NF) and/or microfilter assembly and may be configured to generate pre-treated water with a reduced hardness and sulphate concentration and with less than 1 parts per million (ppm) oil and less than 1 parts per million (ppm) of Total Suspended Solids (TSS).

These and other features, embodiments and advantages of the method and/or system according to the invention are described in the accompanying claims, example, abstract and the following detailed description of non-limiting embodiments depicted in the accompanying drawings, in which description reference numerals are used which refer to corresponding reference numerals that are depicted in the drawings.

Similar reference numerals in different figures denote the same or similar objects.

DETAILED DESCRIPTION OF THE DEPICTED EMBODIMENTS

Figure 1:
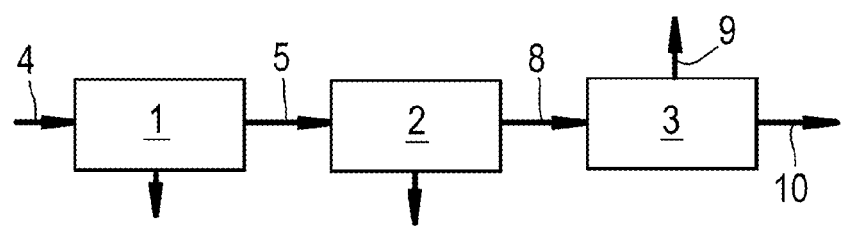
FIG. 1 depicts a process scheme of filtration and Capacitive De-Ionisation (CDI) assemblies for producing treated water suitable for EOR in accordance with the invention.

FIG. 1 depicts a process scheme for an EOR injection water treatment facility according to the invention.

This EOR injection water treatment facility comprises a solids removal filter 1, a capillary Nano-Filtration (NF) unit 2 and a Capacitive De-Ionisation (CDI) unit 3.

A stream 4 of raw source water, which is optionally blended with or alternated by a stream of recycled injection and pore water from the formation, may be fed to the solids removal filter in which coarse particles are removed and the stream 4 may be split into a first pre-treated water stream 5 and a first reject water stream 6. The first pre-treated water stream may be subsequently fed into the capillary or non-capillary Nano-Filtration (NF) unit 2, in which the first pre-treated water stream may be split into a second reject water stream 7 and a second pre-treated water stream 8.

The second pre-treated water stream 8 may be then fed to the Capacitive De-Ionisation (CDI) unit 3 in which the second pre-treated water stream 8 may be split into a third reject water stream 9 and a treated EOR injection water stream 10.

Reducing hardness and salinity of treated injection water 10 offers opportunities to Enhance Oil Recovery (EOR).

Mixing or alternating the flux of the source water 4 with low-salinity brine 10 is feasible if originally highly saline formation water, rich in divalent ions, is present in the pores of the reservoir rock of the oil bearing formation. The presence of clays in reservoir rock dictates a lower Total Dissolved Solids (TDS). Typical TDS limits are 1000-5000 parts per million (ppm). Injection of fresh water for EOR would lead to formation damage from clay swelling.

It is known from UK patent GB2450269 that desalination of water and removal of hardness is also very effective in (i) reducing the amounts of polymers and surfactants required for chemical EOR, and (ii) reducing the risks of reservoir souring and formation of scale.

Sources of injection water may be seawater, brackish water, aquifer water, or produced water, the selection of which depends for example on the location of the oilfield, environmental discharge limits and/or targets to re-use produced water.

Conventional seawater desalination technologies can be classified as distillation methods (e.g. MSF, MED) and membrane processes, such as RO (Reverse Osmosis), NF (Nano Filtration) and Electrodialyses.

RO, such as SWRO (=Sea Water Reverse Osmosis) with either conventional or membrane pre-treatment is presently the most viable desalination method available for offshore application where space is generally constraint.

A drawback of RO, however, is that: (i) permeate water of a too high purity is produced and blending with a higher salinity feedwater is required to achieve the required TDS level, and (ii) RO is sensitive to fouling, and (iii) energy-intensive.

In accordance with the invention an alternative solution is provided for the removal of TDS that overcomes the drawbacks of (SW) RO, i.e. the application of CDI (Capacitive De-Ionisation), possibly combined with capillary NF.

An advantage of using a CDI unit 3 for treating water used for EOR is that the product salinity/hardness can be tuned by the charge of the electrodes; hence blending to increase TDS again, as illustrated by arrows 11 would not be required.

Moreover, no additional chemicals are needed for the regeneration of the CDI unit 3.

Figure 2:
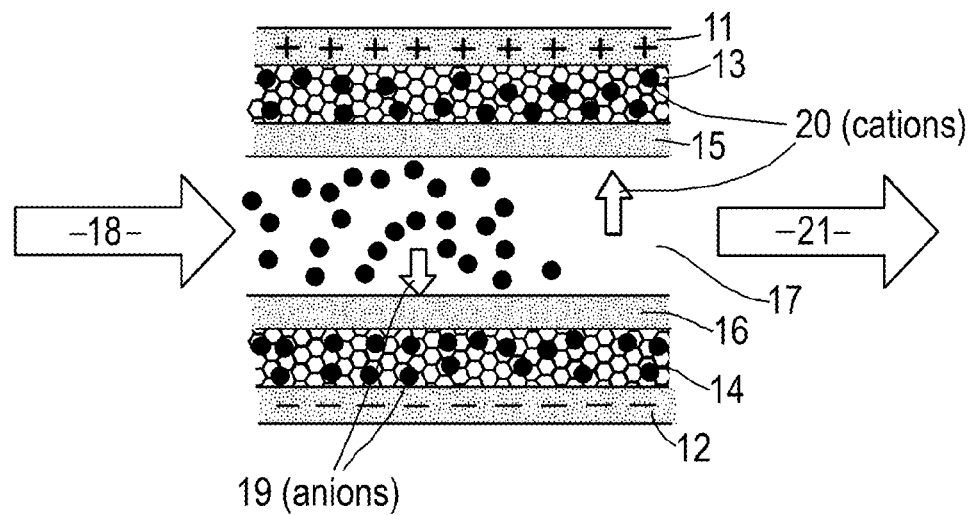
FIG. 2 shows in more detail a longitudinal sectional view of a flow channel in the CDI assembly shown in FIG. 1 in which ions are removed from saline water.

FIG. 2 shows that a CDI unit 3 having an open flowpath 12 arranged between substantially parallel electrode assemblies comprising positively and negatively charged electrodes 13 and 14, which are covered by upper and lower porous carbon electrodes 14 and 15. The upper porous carbon electrode 14 may be covered by an anion exchange membrane 17 and the lower porous carbon electrode 16 may be covered by a cation exchange membrane 18.

The stream of pre-treated water 8 discharged by the NF unit 2 shown in FIG. 1 may flow through the flowpath 12 between the positively and negatively charged electrodes 13 and 14 which attract cations 19 and anions 20, respectively, thereby causing migration of cations into the pores of the upper carbon electrode 15 and migration of anions into the lower carbon electrode 16.

The absence of flow barriers in the open flowpath 12 between the anion and cation exchange membranes 17 and 18 may significantly reduce the risk of fouling in comparison with a RO membrane, which is prone to fouling due to the flow of water through a fine mesh of openings in the wall of the RO membrane. Also no high pressure pumps, membranes, distillation columns or thermal heaters are required.

Pre-treatment may be required as illustrated in FIG. 1 to prevent clogging of a carbon cloth that may be used in the porous carbon electrodes 15 and 16 in the CDI unit 3, for example by pre-treating the seawater stream 4 with a micro and/or other filter 1 and/or a capillary or non-capillary Nano-Filtration (NF) unit 2 shown in FIG. 1.

It has been found that the presence of Natural Organic Matter (NOM) in the source water appears to reduce the inorganic sorption capacity of the carbon aerogel material. Pretreatment for NOM removal may aid the operational efficiency of the CDI process using carbon aerogels.

Partial removal of divalent ions for reduction of hardness and sulphate concentration by application of capillary nano-filtration membranes may be effective as pre-treatment as it is less susceptible to fouling than spiral wound membranes; the latter makes the solution tolerant for the presence of oil and solid traces potentially allowing the re-use of produced water. Partial removal of the presence of higher valency ions potentially also allows better process control in CDI as less preferential loading can be expected.

In comparison with known MF-SWRO desalination methods, the following key-differentiators for the CDI desalination method according to the invention are envisaged:
1. The CDI desaliniation method may require less weight and space; hence the CDI desaliniation method may be applied on certain offshore oil recovery platforms and vessels that are too space and/or weight constrained for the application of MF-SWRO. Also, the lower space and weight requirements may result in significantly lower costs when applied on an offshore platform or vessel.
2. The CDI desalination method may provide higher process efficiency because no blending is required.
3. The CDI desalination method may result in less fouling problems, and, therefore, the process may require fewer remediation measures.
4. The CDI desaliniation method may result in less energy consumption and no chemical consumption.
5. The CDI desalination method may provide a higher degree of operability and maintainability.

It has been observed that EOR water flooding with low salinity (TDS ~3000 ppm; TDS=total dissolved solids) water instead of raw seawater injection Improves Oil Recovery (IOR) and is potentially cost-competitive compared to chemical Enhanced Oil Recovery (EOR) methods. Core flow tests and single well chemical tracer tests have shown that low-salinity water flooding can improve the hydrocarbon recovery efficiency by 5 to 38% of Original Oil In Place (OOIP).

Injection of a stream of low salinity water 10 may shift the wettability of reservoir rock towards a more water-wet state and hence may result in incremental oil recovery. The reverse effect is also possible. The effectiveness of the process is known to depend upon parameters like composition of formation water (ion content, pH), initial water saturation, clay content of the rock formation and oil properties. Also, when used in polymer flooding, the low salinity water stream 10 may require considerably less amounts of polymer, thus reducing the facilities required offshore for transportation, storage, and handling of polymer chemicals.

A summary of optional performance of the water treatment facilities 1-3 shown in FIG. 1 is provided below:
1. Pre-treatment in the NF/RO (membrane softening & desalination) units 1 and 2:
   Oil <1 ppm
   Total suspended solids TSS <1 ppm
2. Low salinity waterflooding stream 10:
   Salt: TDS-1000-5000 ppm
   low hardness to limit amount of an optionally added EOR and/or viscosifying polymer
3. Treated EOR water stream 10, if used as feed for an ASP (Alkaline Surfactant Polymer) cocktail:
   Salt: TDS-1000-2000 ppm
   De-aerate: $O_2$<20 ppb
   Iron: Fe<2 ppm
   min. $O_2$ & Fe levels are required to prevent polymer degradation/precipitation
4. Scaling (hardness)/Souring of treated EOR water stream 10:
   Softening: Ca<40 ppm, Mg<100 ppm,
   SRU (Sulphate Removal Unit) against souring: SO4<20 ppm.
      A Sulphate Removal Unit (SRU) may comprise Nano-Filtration (NF) membranes to remove multi or divalent anions from water, such as $SO_4^{2-}$. In the presence of SRB (Sulphate Reducing Bacteria) sulphate is converted to HS—, leading to souring of the reservoir.

It is known from International patent application WO 2011/135048 that Capacitive Deionization (CDI) is a desalination technology based on ion accumulation into an electric double layer. This double layer is formed when an electrically charged surface of the porous carbon electrode 15,16 is introduced into an aqueous electrolyte solution provided by the pre-treated saline water stream 8. The amount of charge used for double layer formation is directly proportional to the amount of ions 19,20 which can be removed. CDI competes with RO, Ion-Exchange and Electrodialyses but unlike some of these conventional processes no additional chemicals are needed for the regeneration of the unit. Also no high pressure pumps, membranes, distillation columns or thermal heaters are required. The principle of CDI originates from the 1970's. In those days however no suitable materials having high surface area and low electrical resistance were cheaply available, therefore it was not yet feasible to apply this technology to desalination of a saline water stream 8. Nowadays, materials are getting available at lower prices, such as (extruded) powder, fibers and nanotubes. To achieve the maximum amount of adsorption capacity in a short period of time, high surface area materials are used with low electrical resistance, such as activated carbons for making the porous carbon electrodes 15 and 16. Most of present CDI research uses carbon aerogel as adsorbing material in the porous carbon electrodes 15 and 16.

In a competitive environment (i.e., when multiple ions of varying valences are present), the sorption of the divalent species in the porous carbon electrodes 15 and 16 is limited. The pre-treated water stream 6 may flow through the open flowpath 12 between the cation and anion exchange membranes 17 and 18 covering the positively and negatively charged porous carbon electrodes 15 and 16.

By creating a pre-determined electrical potential between the positively and negatively charged carbon electrodes 15 and 16, for example by applying a positive voltage to the current positively charged collector of the first electrode (the anode) 13 and a negative voltage to the current collector of the second electrode (cathode) 15, the anions of the pre-treated water flowing through the open flowpath 12 are attracted to the negatively charged porous electrode 16 and the cations are attracted to the positively charged porous electrode 15. In this way the ions, comprising cations 19 and anions 20, will be removed from the water flowing through the flowpath 12. When the porous electrodes 15 and 16 are saturated with ions the porous electrodes 15 and 16 may be regenerated by releasing the potential difference and electrically discharging the porous electrodes 15 and 16. This will release the ions from the porous electrodes 15 and 16 into the water flowing through the flowpath 12. This will result in an increase in the ion content in the water flowing through the flowpath 12 and this water will be flushed out of the flowpath 12. Once most ions are released from the porous electrodes 15 and 16 and the contaminated water with increased ion content is flushed out of the flowpath 12 the porous electrodes 15 and 16 are regenerated and can be used again for attracting ions for water desalination.

The electrical potential differences between the anode and the cathode porous electrodes 15 and 16 are rather low, for example less than 2 Volt, preferably less than 1.7 Volt and even more preferably less than 1.4 Volt.

It is also useful if the electrical resistance of the electrical circuit provided by the current collectors 13,14 and the porous electrodes 15,16 is low.

The carbon used in the porous carbon electrodes 15 and 16 may comprise activated carbon, and optionally any other carbonaceous material, such as carbon black, carbon aerogels, carbon nanofibres graphene or carbon nanotubes.

The carbon may be chemically activated carbon or may be steam activated carbon. The carbon may have a high surface area of at least 500 $m^2/g$, preferably at least 1000 $m^2/g$, and more preferable at least 1500 $m^2/g$. The cathodic and anodic current collectors 13 and 14 may even be made out of different carbonaceous materials. The porous carbon electrodes 15 and 16 may comprise non-flexible carbon layers comprising carbon aerogels. These aerogels may be manufactured as composite paper: non-woven paper made of carbon fibers, impregnated with resorcinol-formaldehyde aerogel, and pyrolyzed. Depending on the density, carbon aerogels may be electrically conductive, making composite aerogel paper useful for electrodes in capacitors or deionization electrodes.

The carbon may be present in the porous electrodes 15 and 16 in a concentration of at least 60%, preferably at least 70%, more preferable at least 80%, or even at least 85% by weight of the dry electrode. The use of thermoplastic or viscoelastic material such as latex or curable resins to form monoliths from powdered material is common Examples of carbon layers that use polyfluorotetraethylene (PTFE) as binder material are the PACMM™ series commercially available from Material Methods LLC, 30 Hughes, Suite 205, Irvine, Calif. 92618, USA.

The CDI unit 3 according to the invention may comprise porous carbon electrodes 15 and 16 comprising active carbon fiber woven layer or carbon cloth, e.g. ZORFLEX® commercially available from Chemviron Carbon, Zoning Industriel C de Feluy, B-7181 Feluy, Belgium.

Alternatively the CDI unit 3 according to the invention may comprise porous carbon electrodes 15 and 16 covered by anion and cation exchange membranes 17 and 18 comprising a carbon coating comprising polyelectrolyte a binder and carbon, which may be coated directly onto the current collector.

The current collectors 13 and 14 may be made from any suitable metal or metal free electrically conducting material. Suitable metal free materials are e.g. carbon, such as graphite, graphene, graphite sheets or carbon mixtures with high graphite content. It is advantageous to use a metal free electrode because metals are expensive and introduce a risk of corrosion. The current collector is generally in the form of a sheet. Such sheet is herein defined to be suitable to transport at least 33 Amps/$m^2$ and up to 2000 Amps/$m^2$. The thickness of a graphite current collector 13, 14 then typically becomes from 100 to 1000 micrometer, generally 200 to 500 micrometer.

The flow path 12 may comprise a spacer made of a permeable inert type material such as an open space synthetic material, plastic and/or fiberglass.

The spacer may be made of a material that is electrically insulating, but allows ion conductance. Suitable spacers are for example the NITEX® or PETEX® commercially available from Sefar Inc., 111 Calumet Street, Depew, N.Y. 14043, USA, which are open mesh fabrics or filter fabrics, made from polyamide or polyethyleneterephthalte.

The anion and cation exchange membranes 17 and 18 may comprise a charge barrier, which is selective for anions or cations, or certain specific anions or cations, and which may be placed between the porous electrodes 15 and 16 and the spacer in the flow path 12. The charge barrier may be applied to the high surface area electrode layer as a coating layer or as a laminate layer.

Suitable membrane materials may be homogeneous or heterogeneous. Suitable membrane materials comprise anion exchange and/or cation exchange membrane materials, preferably ion exchange materials comprising strongly dissociating anionic groups and/or strongly dissociating cationic groups. Examples of such membrane materials are NEOSEPTA™ commercially available from Tokuyama Corp., PC-SA™ and PC-SK™ commercially available from PCA GmbH, ion exchange membrane materials commercially available from FuMA-Tech GmbH, ion exchange membrane materials RALEX™ commercially available from Mega or EXCELLION™ heterogeneous membrane material commercially available from Snowpure.

The porous electrodes 15 and 16 may be floating electrodes that are not directly connected to a power source but receive their charge from other electrodes in a stack of CDI units 3 which are connected to an electrical power source. Floating electrodes may be positioned parallel and in between the master electrodes in a stack of CDI units 3. An advantage of using floating electrodes is that the voltages through the CDI unit 3 will be higher while the currents through CDI unit 3 will be lower. Electrical resistivity in the CDI unit 3 may be lowered significantly by using floating electrodes.

EXAMPLE

In this example three different processes for seawater desalination are compared, see table 1. In all three processes a pre-treatment step using a high-performance nanofiltration step is applied to produce a permeate which usually has a TDS equivalent to brackish water.

TABLE 1

Comparison of three membrane processes for seawater desalination

|  | Stage 1 | Stage 2 |
|---|---|---|
| Process 1 | high-performance nanofiltration | Brackish water reversed osmosis (BWRO) membranes |
| Process 2 | high-performance nanofiltration | high-performance nanofiltration |
| Process 3 | high-performance nanofiltration | Capacitive Deionisation (CDI) |

Process 1 is a commonly applied method to produce potable water from seawater based on nano-filtration and reversed osmosis.

Process 2 is a known dual stage Nano Filtration (NF) seawater desalination system described in U.S. Pat. No. 7,144,511 by Diem Xuan Vuong. A disadvantage of this known dual stage NF process is its lower overall recovery rate compared to process 1.

Process 3 describes the combination of Nano-Filtration with Capacitive De-Ionization (CDI) in accordance with the invention.

In tables 2,3 and 4 below, performance data for the three processes are presented.

It can be seen that the known Processes 1 and 2 produce a permeate quality that does not meet the required TDS specifications for IOR or EOR purposes (TDS=62 and 586 mg/L, respectively).

In order to obtain the desired water quality blending with raw seawater is required.

In contrast Process 3 according to the invention is able to produce the target water specifications without the need for blending, resulting in significantly lower operating cost.

TABLE 2

Performance data for Process 1 (Prior art: Seawater desalination using a NF-BWRO)

|  | Seawater composition mg/L | Permeate from first stage NF mg/L | Permeate from 2nd stage BWRO mg/L |
|---|---|---|---|
| $Ca^{2+}$ | 410 | 16 | 0.1 |
| $Mg^{2+}$ | 1310 | 52 | 0.5 |
| $Na^+$ | 10900 | 1635 | 24 |
| $K^+$ | 390 | 62 | 1 |
| $Ba^{2+}$ | 0.05 | 0 | 0 |
| $Sr^{2+}$ | 13 | 0 | 0 |
| $Fe^{3+}$ | 0.02 | 0 | 0 |
| $Mn^{2+}$ | 0.01 | 0 | 0 |
| $SiO_4$ | 8 | 0 | 0 |
| $Cl^-$ | 19700 | 2758 | 36 |
| $SO_2^-$ | 2740 | 55 | 0.3 |
| $F^-$ | 1.4 | 0 | 0 |
| $HCO_3^-$ | 152 | 8 | 0.2 |
| TDS | 35624 | 4587 | 62 |

TABLE 3

Performance data for Process 2 (Prior Art: Seawater desalination using a NF-NF line-up)

|  | Seawater composition mg/L | Permeate from first stage NF mg/L | Permeate from 2nd stage NF mg/L |
|---|---|---|---|
| $Ca^{2+}$ | 410 | 16 | 0.9 |
| $Mg^{2+}$ | 1310 | 52 | 3 |
| $Na^+$ | 10900 | 1635 | 218 |
| $K^+$ | 390 | 62 | 9 |
| $Ba^{2+}$ | 0.05 | 0 | 0 |
| $Sr^{2+}$ | 13 | 0 | 0 |
| $Fe^{3+}$ | 0.02 | 0 | 0 |
| $Mn^{2+}$ | 0.01 | 0 | 0 |
| $SiO_4$ | 8 | 0 | 0 |
| $Cl^-$ | 19700 | 2758 | 353 |
| $SO_2^-$ | 2740 | 55 | 1 |
| $F^-$ | 1.4 | 0 | 0 |
| $HCO_3^-$ | 152 | 8 | 0.6 |
| TDS | 35624 | 4587 | 586 |

TABLE 4

Performance data for Process 3 (Seawater desalination using a NF-CDI line-up in accordance with the present invention)

|  | Seawater composition mg/L | Permeate from first stage NF mg/L | Permeate from CDI mg/L |
|---|---|---|---|
| $Ca^{2+}$ | 410 | 16 | 8.2 |
| $Mg^{2+}$ | 1310 | 52 | 26.2 |
| $Na^+$ | 10900 | 1635 | 817.5 |
| $K^+$ | 390 | 62 | 31.2 |
| $Ba^{2+}$ | 0.05 | 0 | 0.0005 |
| $Sr^{2+}$ | 13 | 0 | 0.195 |
| $Fe^{3+}$ | 0.02 | 0 | 0.0002 |
| $Mn^{2+}$ | 0.01 | 0 | 0.0001 |
| $SiO_4$ | 8 | 0 | 0.04 |
| $Cl^-$ | 19700 | 2758 | 1379 |
| $SO_2^-$ | 2740 | 55 | 27.4 |
| $F^-$ | 1.4 | 0 | 0.098 |
| $HCO_3^-$ | 152 | 8 | 3.8 |
| TDS | 35624 | 4587 | 2294 |

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While systems and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A method for enhancing oil recovery from an oil bearing formation, the method comprising:
   filtering at least some solids from a source water having a total dissolved solids content of from 10000 ppm to 50000 ppm in a filtration assembly to produce pre-treated water;
   treating the pre-treated water in a capacitive de-ionisation assembly comprising at least one flowpath for pre-treated water arranged between a pair of oppositely charged electrodes which adsorb and thereby remove at least some ions from the pre-treated water flowing through the flowpath, thereby producing treated water having a total dissolved solids (TDS) content between 1,000 and 5,000 parts per million (ppm); and
   injecting the treated water with reduced salinity and solids content into the oil bearing formation to mobilize crude oil and enhance oil recovery.

2. The method of claim 1, wherein the electrodes comprise substantially parallel porous plates comprising activated carbons that are electrically charged by a direct current electrical power source connected to the plates.

3. The method of claim 2, wherein the porous plates comprise carbon aerogel.

4. The method of claim 1, wherein the filtration assembly comprises a microfilter assembly.

5. The method of claim 1, wherein the filtration assembly generates pre-treated water with a reduced hardness and sulphate concentration relative to the source water and with less than 1 parts per million (ppm) oil and less than 1 part per million (ppm) total suspended solids.

6. The method of claim 1, wherein the source water has TDS content between 30,000 and 40,000 mg/liter.

7. The method of claim 6, wherein the treated water has a TDS between 2,000 and 5,000 parts per million (ppm).

8. The method of claim 7, wherein the treated water has a lower salinity than pore water present in the formation before initiation of treated water injection.

9. The method of claim 7, wherein the treated water has a lower ionic strength than pore water present in the formation before initiation of treated water injection.

10. The method of claim 1 wherein the source water is selected from the group consisting of seawater, brackish water, water produced from the oil bearing formation, saline aquifer water, and mixtures thereof.

* * * * *